(12) United States Patent
Graves et al.

(10) Patent No.: US 9,789,889 B2
(45) Date of Patent: Oct. 17, 2017

(54) SLACK ADJUSTER FOR NARROW GAUGE RAILROAD CARS

(71) Applicant: NEW YORK AIR BRAKE, LLC, Watertown, NY (US)

(72) Inventors: Brian Graves, Croghan, NY (US); Jeffrey Sauter, Lowville, NY (US); Derick Call, Evan Mills, NY (US); James Brierley, Granville (AU)

(73) Assignee: New York Air Brake, LLC, Watertown, NY (US)

( * ) Notice: Subject to any disclaimer, the term of this patent is extended or adjusted under 35 U.S.C. 154(b) by 28 days.

(21) Appl. No.: 14/523,504

(22) Filed: Oct. 24, 2014

(65) Prior Publication Data

US 2016/0114816 A1    Apr. 28, 2016

(51) Int. Cl.
  *B61H 15/00*  (2006.01)
  *F16D 65/52*  (2006.01)
  *F16D 65/56*  (2006.01)

(52) U.S. Cl.
  CPC ..... *B61H 15/0021* (2013.01); *B61H 15/0028* (2013.01); *F16D 65/52* (2013.01); *F16D 65/56* (2013.01)

(58) Field of Classification Search
  CPC ..... B60T 8/175; B61H 15/00; B61H 15/0057; B61H 15/0028; B61H 13/24; F16D 65/66;

(Continued)

(56) References Cited

U.S. PATENT DOCUMENTS 3,177,985 A * 4/1965 Rauglas ............. B61H 15/0057
                                                188/196 D
3,326,336 A * 6/1967 Sobol ................ B61H 15/0057
                                                188/196 D (Continued)

FOREIGN PATENT DOCUMENTS

DE        3504040 A1    8/1985
EP        0014417 A1    8/1980

(Continued)

OTHER PUBLICATIONS

International Search Report Form PCT/ISA/220, International Application No. PCT/US0214/062226, pp. 1-10, Dated Jun. 22, 2015.

*Primary Examiner* — Robert A Siconolfi
*Assistant Examiner* — San Aung
(74) *Attorney, Agent, or Firm* — Bond Schoeneck & King, PLLC; David Nocilly

(57) ABSTRACT

A slack adjuster for narrow gauge rail cars including a housing having a body with a first clevis joint, a coupling secured to the body, and a guide tube secured to the body coupling. A lever is pivotally coupled to the housing for moving an actuator coupled to a clutch. The clutch is engaged with the external threads of a rod and moveable between a first captured position, a second position where the clutch is free to rotate, and a second captured position to selectively control movement of the rod. Movement of the lever withdraws the actuator so that the clutch releases and can spin, allowing the threaded rod to translate from the retracted to extended positions. Opposing forces applied to a ram causes the clutch to move to the second captured position, thereby preventing rotation of the clutch and preventing the threaded rod from retracting further into the housing.

15 Claims, 4 Drawing Sheets

(58) Field of Classification Search
CPC ...... F16D 65/0025; F16D 65/00; F16D 65/56;
F16J 15/44; F16J 15/441
USPC .................................................. 188/199, 202
See application file for complete search history.

(56) References Cited

U.S. PATENT DOCUMENTS

| | | | |
|---|---|---|---|
| 3,338,356 A | | 8/1967 | Woldimar et al. |
| 3,520,387 A | * | 7/1970 | Natschke ........... B61H 15/0057 188/196 D |
| 3,550,731 A | * | 12/1970 | Maggio ................... B60T 17/16 188/153 R |
| 3,900,086 A | | 8/1975 | Billeter |
| 4,646,882 A | * | 3/1987 | Holloway .............. B61H 15/00 188/196 D |
| 4,662,485 A | * | 5/1987 | Kanjo ................... B61H 15/00 188/196 D |
| 5,667,040 A | * | 9/1997 | Samulak ................ B61H 13/24 188/197 |
| 7,802,662 B2 | * | 9/2010 | Sommerfeld .......... B61H 13/24 188/197 |

FOREIGN PATENT DOCUMENTS

| | | |
|---|---|---|
| FR | 1407304 A | 7/1965 |
| GB | 1440966 A | 6/1976 |
| GB | 2172678 A | 9/1986 |
| WO | 2012112659 A2 | 8/2012 |
| WO | WO-2012174505 * | 12/2012 |
| WO | 2015002798 A1 | 1/2015 |

* cited by examiner

US 9,789,889 B2

SLACK ADJUSTER FOR NARROW GAUGE RAILROAD CARS

BACKGROUND OF THE INVENTION

1. Field of the Invention

The present invention relates to slack adjusters and, more particularly, a slack adjuster that will perform adequate take up when used on narrow gauge rail cars.

2. Description of the Related Art

Slack adjusters are provided in the brake rigging of railway vehicles to automatically adjust the slack in the brake rigging to maintain the brake cylinder piston rod travel within a specified distance. Brake cylinder piston rod travel is important for proper balancing of the fluid pressure in the brake cylinder so that all brakes on a train operate under the same conditions and timing and to ensure the substantially uniform braking forces are applied to each set of wheels on each car in the train. Unfortunately, conventional slack adjusters do not provide for sufficient take up in the desired compressed state when used on narrow gauge rail cars. Accordingly, there is a need for a slack adjusting having a compact design for use with narrow gauge rail cars.

BRIEF SUMMARY OF THE INVENTION

The present invention comprises a slack adjuster having a housing having a body with a first clevis joint, a body coupling secured to the body, and a guide tube secured to the body coupling. An actuator is slidingly positioned in the body of the housing and biased toward the guide tube. A lever is pivotally coupled to and extends from the housing. The lever has one end engaged with the actuator to move the actuator when the lever is pivoted. A rod having external threads extends through the housing and is moveable between a retracted position and an extended position. A ram having a second clevis joint is coupled to the rod. A clutch positioned in the housing is engaged with the external threads of the rod and is axially moveable with the housing. The clutch moves between a first position where the clutch is engaged with a first bearing surface that prevents rotation of the clutch, a second position where the clutch is free to rotate, and a third position where the clutch is engaged with a second bearing position that prevents rotation of the clutch. The clutch is preferably biases by a spring positioned in the guide tube so that the clutch moves out of the first position when the actuator is withdrawn by the lever. Movement of the lever will withdraw the actuator so that the clutch may be biased from the first position into the second position, thereby allowing the clutch to spin and the threaded rod to translate from a retracted position to an extended position. Opposing forces applied to the ram will cause the clutch to move past the second position into the third position where the clutch engages the second bearing surface, thereby preventing rotation of the clutch and preventing the threaded rod from retracting any further into the housing.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
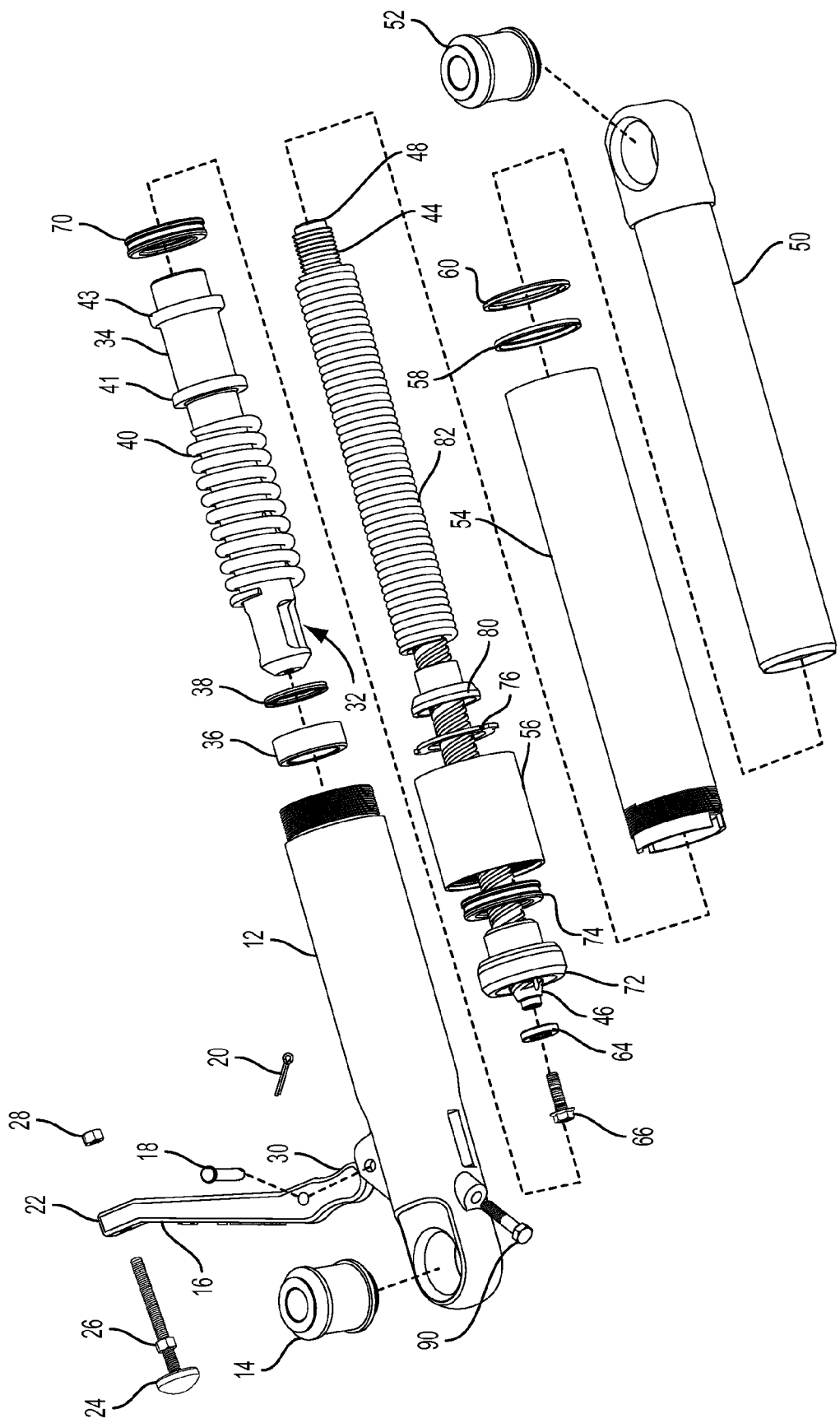
FIG. 1 is an exploded view of a slack adjuster according to the present invention.

Referring now to the drawings, wherein like reference numerals refer to like parts throughout, there is seen in FIG. 1 a slack adjuster 10 having a compact configuration for use in connection with narrow gauge rail cars. Slack adjuster 10 comprises an eye body housing 12 having a first end 14 for connecting one end of slack adjuster 10 to the braking system of a rail car. For example, as seen in FIG. 1, first end 14 may include a clevis joint and is fixed relative to the brake piston of the braking system. Body housing 12 supports a trigger assembly including an actuating lever 16 that is pivotally mounted by a clevis pin 18 to body housing 12 and used to sense piston stroke during a brake application. Clevis pin 18 may be secured in place by a cotter pin 20. A first end 22 of lever 16 is connected to an adjustment screw 24 that is held in place by double locking nuts 26 and 28.

Figure 2:
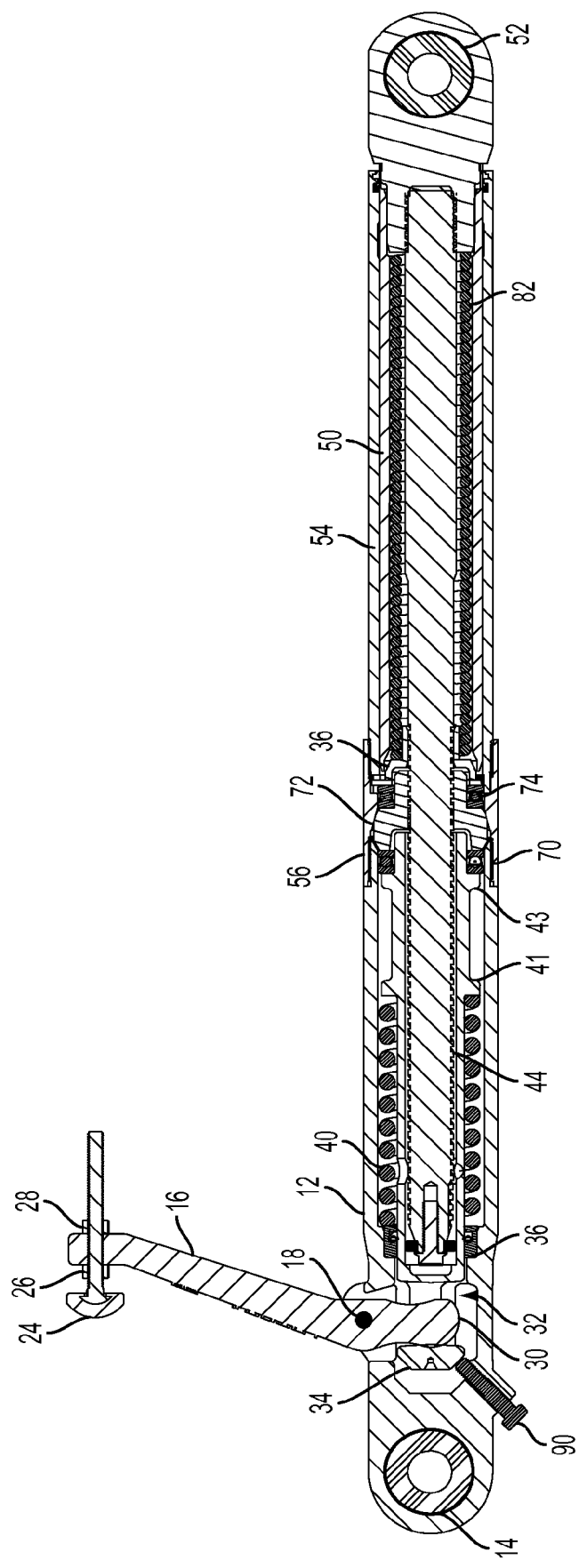
FIG. 2 is a longitudinal cross-section of a slack adjuster according to the present invention.

As seen in FIG. 2, a second end 30 of lever 16 extends into housing 12 and through a slot 32 formed in the end of an actuating tube 34. As a result, pivotal movement of first end 22 of lever 16 in response to forces applied to adjustment screw 24 will cause second end 30 of lever 16 to move actuating tube 34 axially within body housing 12. A guide ring 36 and a wiper ring 38 are positioned about actuating tube 34. Actuating tube 34 includes a pair of outwardly extending flanges 41 and 43 positioned along an intermediate portion of tube 34. A compression spring 40 is mounted about actuating tube 34 and is in engagement with guide ring 36 and flange 41 so that actuating tube 34 is biased longitudinally along the interior of housing 12 away from second end 30 of lever 16.

Figure 3:
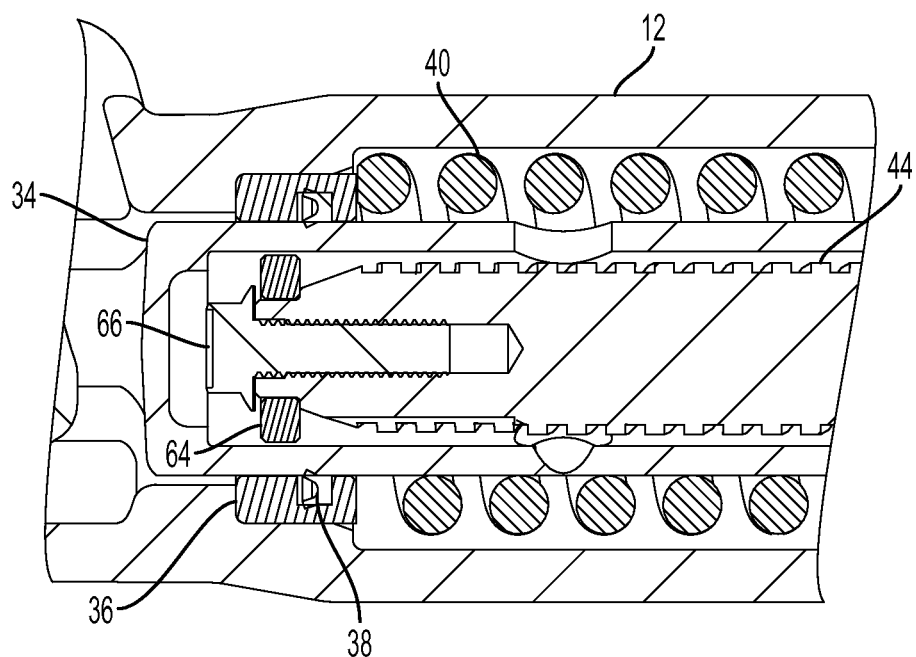
FIG. 3 is a longitudinal cross-section of a portion of an actuating assembly for a slack adjuster according to the present invention.

Slack adjuster 10 further comprises a threaded compression rod 44 that extends along the longitudinal axis of slack adjuster 10 from a first end 46 through the interior of actuating tube 34 to a second end 48 secured to the interior of a ram tube 50. Ram tube 50 includes a second end 52 for connection to the braking system of a rail car. For example, as seen in FIG. 1, second end 52 may include a clevis joint for connection to the braking system, such as a brake beam. Ram tube 50 is positioned for telescopic movement within a guide tube 54 that is fixedly secured to body housing 12 by a body coupling 56, such as by complementary threads on each of body housing 12, body coupling 56 and guide tube 54. A pair of wiper seals 58 and 60 may be positioned around ram tube 50 to seal the interface between ram tube 50 and guide tube 54, and to retain lubrication internally and exclude external contaminants when ram tube 50 telescopes into and out of guide tube 54. As seen in FIG. 3, first end 46 of rod 44 has a safety washer 64 held in place by a screw 66.

Figure 4:
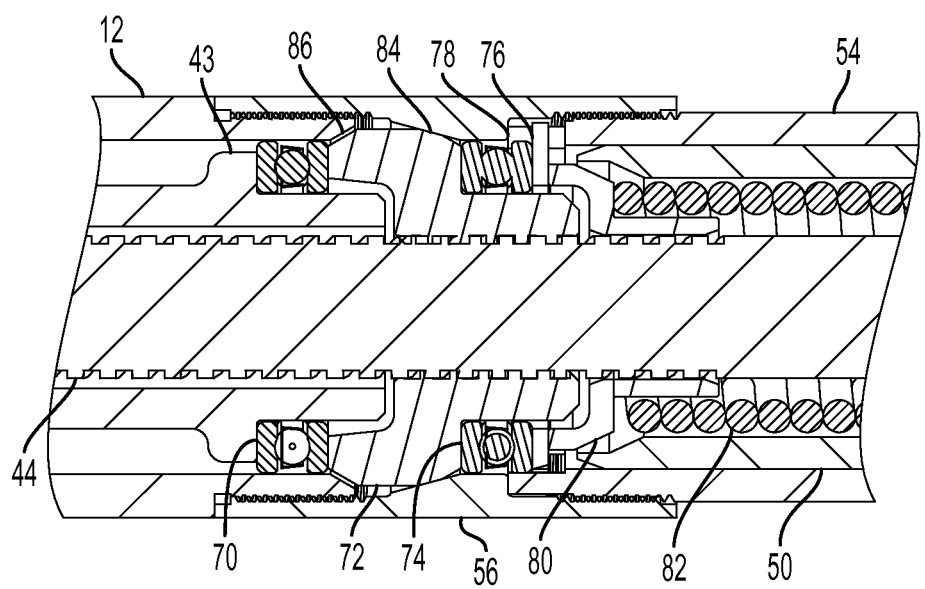
FIG. 4 is a longitudinal cross-section of a portion of a clutch assembly for a slack adjuster according to the present invention.

Referring to FIG. 4, axial movement of rod 44 in response to telescoping forces applied to second end 52 of ram tube 50 is controlled by a clutch assembly positioned within body coupling 56. Clutch assembly includes a first thrust bearing 70 positioned in abutment to second flange 43 of actuating tube 34, a clutch 72 having high helix threads for rotational movement within body coupling 56 in response to axial movement of threaded compression rod 44, and a second thrust bearing 74 positioned on the opposing side of clutch 72. Second thrust bearing 74 is held in place by an anti-rotation washer 76 that move axially within body coupling 56 to abut an interior lip 78 of guide tube 54. A guide ring 80 contains a compression spring 82 within ram tube 50. Guide ring 80 and anti-rotation washer 76 limit any forces applied by compression spring 82 to clutch 72 to enable free rotation of clutch 72 during certain operational circumstances, as explained below. Body coupling 56 includes an interior ramped bearing surface 84 that can engage clutch 72 to prevent rotation thereof. When a force is applied to first bearing 70, it will move into engagement with clutch 72 and press clutch 72 into bearing surface 84, thereby preventing rotation of clutch 72. Similarly, body housing 12 includes an interior ramped bearing surface 86 that engages clutch 72 to prevent rotation thereof when a force is applied to second bearing 74 and it moves clutch 72 in the opposite direction. Thus, thrust bearings 70 and 74 and corresponding bearing surfaces 84 and 86 cooperative to selectively allow or prevent rotation of clutch 72 based on a predetermined amount of axial movement in either direction. Telescoping of threaded compression rod 44 and ram tube 50 into and out of guide tube 54 is thus controlled in response to the axial forces applied to thrust bearings 70 and 74. A screw 90 may be installed in body housing 12 during shipment to prevent accidental triggering and extension of ram tube 50.

During operation, actuating lever 16 pivots about clevis pin 18 to transmit forces applied to adjustment screw 24 to actuating tube 34 to overcome the spring force supplied by compression spring 40. When this occurs, clutch 72 is allowed to transition away from bearing surface 84 of body coupling 56 and thus may rotate freely. When clutch 72 is free to rotate about compression rod 44, compression rod 44 is released for axial movement so that ram tube 50 can extend under the influence of compression spring 82, thereby setting the length of slack adjuster 10 into a new configuration that compensates for any slack in the braking system that has resulted from brake pad wear. Compression spring 82 supplies the necessary force to overcome internal friction and external loads, and safety washer 64 limits the travel of ram tube 50 by contacting clutch 72 to prevent further axial movement of compression rod 44.

During knock down, i.e., collapsing of slack adjuster 10, external force is exerted on ram tube 50 by the rail car braking system via second end 52 and first end 14. Notably, knock down may also be performed manually by a person using a level to pry the brake head away from the wheels when the braking system is in the brakes releases state, which will also collapse slack adjuster 10, so that the brake shoes may be replaced. The knock down force overcomes compression spring 82, which is less than the preload of compression spring 40. When the compressive force between second end 52 and first end 14 exceeds the preload on compression spring 40, clutch 72 disengages from bearing surface 84. Clutch 72 is then free to threadably rotate about compression rod 44. As a result, compression spring 82 is compressed and, through the telescoping movement of compression rod 44 within actuating tube 34 allowed by clutch 72, overall length of slack adjuster 10 is changed. Thus, the separation of clutch 72 from bearing surface 84 of body coupling 56 allows clutch 72 to rotate and so that compression rod 44 and ram tube 50 may collapse.

During a brake application, the brake piston, or a proxy for the brake piston contacts actuating lever 16. If actuating lever 16 is actuated so that it pulls actuating tube 34 far enough to compress spring 40 by an amount equal to or greater than the gap between clutch 72 and bearing surface 86, the compression rod 44 and clutch 72 will translate through that gap and clutch 72 will contact bearing surface 86, thereby allowing clutch 72 to hold against the full brake load. If, during the brake application, a brake load is developed between first end 14 and second end 52 before the brake piston (or its proxy) contacts lever 16, i.e., the piston stroke is too short, slack adjuster 10 will operate as described above with respect to knock down, and will shorten until the piston contacts lever 16. If, during the brake application, the brake piston contacts lever 16 before a brake load is developed between first end 14 and second end 52, that is, the brake piston stroke is too long due to wear of the brake pads, movement of lever 16 will compress spring 40. As a result, clutch 72 will separate from bearing surface 84 and spring 82 can extend the length of the slack adjuster until first end 14 second end 52 are loaded, thereby setting the length of slack adjuster 10 into a new configuration that compensates for any slack in the braking system that has resulted from brake pad wear.

What is claimed is:

1. A slack adjuster, comprising:
   a housing having a body, a body coupling secured to the body, and a guide tube secured to the body coupling;
   an actuator slidingly positioned in the body of the housing and biased toward the guide tube;
   a lever pivotally coupled to and extending from the housing and having one end operatively engaged with the actuator;
   a rod having external threads extending through the housing and being moveable between a retracted position and an extended position;
   a ram secured to the rod and slidingly positioned in the guide tube;
   a clutch engaged with the external threads of the rod and axially moveable with the housing between a first position where the clutch is engaged with a first bearing surface on the inside of the housing that prevents rotation of the clutch, a second position where the clutch is free to rotate, and a third position where the clutch is engaged with a second bearing position on the inside of the housing that prevents rotation of the clutch.

2. The slack adjuster of claim 1, wherein the first bearing surface is positioned on the inside of the body coupling.

3. The slack adjuster of claim 2, wherein the second bearing surface is positioned on the inside of the body.

4. The slack adjuster of claim 3, further comprising a spring positioned between the rod and the ram that biases a guide ring toward the clutch.

5. The slack adjuster of claim 4, further comprising a safety washer secured an end of the rod and having an outer diameter that is larger than an outer diameter of the rod.

6. The slack adjuster of claim 5, wherein the clutch includes an internal diameter that is smaller than the outer diameter of the safety ring.

7. The slack adjuster of claim 6, wherein the actuator is biased by a spring that engages a first flange extending circumferentially around the actuator and a guide ring position in the body of the housing.

8. The slack adjuster of claim 7, further comprising a second flange extending circumferentially around the actuator and positioned proximately to the clutch.

9. The slack adjuster of claim 8, further comprising a screw positioned in the housing and moveable into engagement with the actuator.

10. The method of adjusting slack in a rail car braking system, comprising the steps of:
    providing a slack adjuster comprising a housing having a body, a body coupling secured to the body, and a guide tube secured to the body coupling, an actuator slidingly positioned in the body of the housing and biased toward the guide tube, a lever pivotally coupled to and extending from the housing and having one end operatively engaged with the actuator, a rod having external threads extending through the housing and being moveable between a retracted position and an extended position, a ram secured to the rod and slidingly positioned in the guide tube, and a clutch engaged with the external threads of the rod and axially moveable with the housing between a first position where the clutch is engaged with a first bearing surface on the inside of the housing that prevents rotation of the clutch, a second position where the clutch is free to rotate, and a third position where the clutch is engaged with a second bearing position on the inside of the housing that prevents rotation of the clutch;

applying a first force to the lever of the slack adjuster to move the actuator out of engagement with the clutch, thereby allowing the clutch to move from a first captured position to a released position;

extending the threaded rod from the slack adjuster while the clutch is in the released position;

retracting the threaded rod from the slack adjuster while the clutch is in the released position; and moving the clutch into a second captured position in response to a second force applied to the lever to stop retracting the threaded rod.

11. The method of claim 10, wherein the lever is pivotally mounted to and extends into a housing of the adjuster to engage the actuator.

12. The method of claim 11, wherein the actuator is biased to move the clutch into the first captured position.

13. The method of claim 12, further comprising a spring biasing the clutch into the second position.

14. The method of claim 13, wherein the housing of the slack adjuster has a first bearing surface that engages the clutch when in the first captured position.

15. The method of claim 13, wherein the housing of the slack adjuster has a second bearing surface that engages the clutch when in the second captured position.

* * * * *